(12) United States Patent
Nairn et al.

(10) Patent No.: US 10,211,990 B2
(45) Date of Patent: Feb. 19, 2019

(54) AUTHENTICATING MESSAGES SENT OVER A VEHICLE BUS THAT INCLUDE MESSAGE AUTHENTICATION CODES

(71) Applicant: GM Global Technology Operations LLC, Detroit, MI (US)

(72) Inventors: David M. Nairn, Plymouth, MI (US); Thomas M. Forest, Macomb, MI (US); Padma Sundaram, West Bloomfield, MI (US); Mohammed Abdulla Yousuf, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 86 days.

(21) Appl. No.: 15/215,078

(22) Filed: Jul. 20, 2016

(65) Prior Publication Data

US 2016/0330032 A1    Nov. 10, 2016

Related U.S. Application Data

(63) Continuation-in-part of application No. 14/340,726, filed on Jul. 25, 2014.

(51) Int. Cl.
| | | |
|---|---|---|
| *H04L 9/32* | (2006.01) | |
| *G06F 13/42* | (2006.01) | |
| *G06F 21/64* | (2013.01) | |
| *G06F 21/85* | (2013.01) | |

(52) U.S. Cl.
CPC ........ *H04L 9/3242* (2013.01); *G06F 13/4282* (2013.01); *G06F 21/64* (2013.01); *G06F 21/85* (2013.01); *H04L 2209/84* (2013.01)

(58) Field of Classification Search
CPC ... H04L 9/3242; H04L 2209/84; G06F 21/85; G06F 21/64; G06F 13/4282
See application file for complete search history.

(56) References Cited

U.S. PATENT DOCUMENTS

| | | |
|---|---|---|
| 2007/0173229 A1 | 7/2007 | Dong et al. |
| 2008/0024287 A1 | 1/2008 | Boyle et al. |
| 2011/0238997 A1 | 9/2011 | Bellur et al. |
| 2013/0054964 A1 | 2/2013 | Messerges et al. |
| 2013/0111582 A1* | 5/2013 | Forest ................ G06F 21/44 726/19 |

(Continued)

*Primary Examiner* — Robert B Leung
*Assistant Examiner* — Thomas Ho
(74) *Attorney, Agent, or Firm* — David Willoughby; Reising Ethington P.C.

(57) ABSTRACT

A method of transmitting data within a vehicle includes: storing two copies of a data message; constructing at an electronic control unit (ECU) a serial bus message that includes one copy of the data message and a message authentication code (MAC) created using a secret key stored at the ECU, a MAC algorithm, and a different copy of the data message; transmitting the serial bus message to a receiving ECU over a vehicle bus; authenticating the serial bus message at the receiving ECU using a copy of the key stored at the receiving ECU by creating a copy of the MAC from the data message included in the serial bus message and the copy of the key; comparing the MAC from the serial bus message with the copy of the MAC created at the receiving ECU; and rejecting or accepting the data message based on the comparison.

17 Claims, 3 Drawing Sheets

(56) References Cited

U.S. PATENT DOCUMENTS

| | | | |
|---|---|---|---|
| 2013/0156017 A1* | 6/2013 | Hori | H04W 88/02 |
| | | | 370/336 |
| 2014/0095286 A1 | 4/2014 | Drewry et al. | |
| 2014/0114497 A1* | 4/2014 | Miyake | H04L 9/32 |
| | | | 701/1 |
| 2015/0379678 A1* | 12/2015 | Al-otoom | G06T 1/60 |
| | | | 345/537 |

* cited by examiner

AUTHENTICATING MESSAGES SENT OVER A VEHICLE BUS THAT INCLUDE MESSAGE AUTHENTICATION CODES

This application is a continuation-in-part of U.S. patent application Ser. No. 14/340,726 filed on Jul. 25, 2014, the contents of which are hereby expressly incorporated by reference in their entirety.

TECHNICAL FIELD

The present invention relates to data messages sent over a vehicle bus and, more particularly, to authenticating the data messages using message authentication codes (MACs).

BACKGROUND

Vehicles include a variety of systems that are used to operate the vehicle. In general, each vehicle system may be directed to a different aspect of vehicle operation. For example, the vehicle can include an engine and transmission to power the vehicle, a power steering system for vehicle control, and a braking system to slow or stop the vehicle, to name just a few vehicle functions. Individual vehicle systems can be assigned to execute the propulsion, control, and braking functions of the vehicle—as well as other, different vehicle functions.

The vehicle systems are often controlled at the direction of electronic control units (ECUs) that are each communicatively connected to each other by a vehicle communications bus as well as to the vehicle systems. As part of directing their respective vehicle systems, the ECUs can exchange information over the vehicle bus in the form of serial bus messages. It is important that the messages transmitted over the bus are accurate so that the ECU receiving the message can respond accurately and appropriately. In the past, the messages sent over the vehicle bus have been sent with a checksum that can indicate to the ECU receiving the message whether or not the message has been unintentionally corrupted. But use of a checksum may not ensure the integrity of messages against efforts to intentionally alter the contents of messages. As a result, use of techniques other than a checksum for verifying the integrity of intra-vehicle messages could be beneficial to protect those messages against corruption of data that is either intentional or unintentional. Furthermore, the payload for data on a serial bus message is limited. Including the checksum in the payload of the serial bus message can consume space that could be used to communicate additional information in the data message.

SUMMARY

According to an embodiment of the invention, there is provided a method of transmitting data within a vehicle over a vehicle bus. The method includes storing first and second copies of a data message in at least one memory installed to the vehicle. The method further includes constructing at an electronic control unit (ECU) a serial bus message that includes the first copy of the data message and a message authentication code (MAC). The MAC is created using a secret key stored at the ECU, a MAC algorithm, and the second copy of the data message. The method further includes transmitting the serial bus message to a receiving ECU over the vehicle bus; and authenticating the serial bus message at the receiving ECU using a copy of the secret key stored at the receiving ECU by: creating a copy of the MAC from the first copy of the data message included in the serial bus message, the copy of the secret key, and the MAC algorithm; comparing the MAC included in the serial bus message with the copy of the MAC created at the receiving ECU; and rejecting or accepting the data message based on the comparison.

According to another embodiment of the invention, there is provided a method of transmitting data within a vehicle over a vehicle bus. The method includes storing first and second copies of a data message in at least one memory installed to the vehicle, with at least one of the first and second copies of the data message being stored in a volatile memory of the sending ECU. The method further includes, after the step of storing the first and second copies of the data message, constructing at an electronic control unit (ECU) a serial bus message that includes the first copy of the data message and a message authentication code (MAC). The MAC is created using a secret key stored at the ECU, a MAC algorithm, and the second copy of the data message. The method further includes transmitting the serial bus message to a receiving ECU over the vehicle bus; and authenticating the serial bus message at the receiving ECU using a copy of the secret key stored at the receiving ECU by: creating a copy of the MAC from the first copy of the data message included in the serial bus message, the copy of the secret key, and the MAC algorithm; comparing the MAC included in the serial bus message with the copy of the MAC created at the receiving ECU; and rejecting or accepting the data message based on the comparison.

According to another embodiment of the invention, there is provided an electronic control unit (ECU) for transmitting data within a vehicle over a vehicle bus. The ECU includes a microprocessor that executes one or more computer-readable instructions; and a memory device communicatively coupled with the microprocessor such that the memory device can receive requests from the microprocessor for data stored at the memory device. The memory device may be configured to store first and second copies of a data message. The ECU may further include an input/output port for sending and receiving data over a vehicle bus; a secret key stored in the memory device; and a message authentication code (MAC) algorithm stored at the memory device. The microprocessor may be configured to create a serial bus message including a data message comprising the first copy of the data message, with the serial bus message also including a message authentication code (MAC) that is created using the second copy of the data message, the secret key, and the MAC algorithm.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

The system and method described below transmits data within a vehicle over a vehicle bus using serial bus messages that are verified using a message authentication code (MAC). Electronic control units (ECU) that transmit or receive serial bus messages over the vehicle bus can each store a copy of a secret key that is used to create or recreate a MAC using the data message sent with the serial bus messages. When an ECU sends a serial bus message over the vehicle bus, the ECU can include with the serial bus message a MAC that is used to verify that the included data message is trustworthy and correct. The ECU can generate a MAC using a MAC algorithm, which is a function of the data to be sent, the secret key, and the data message. Example MAC algorithms include a hash-based message authentication code (HMAC) algorithm and a block cipher-based message authentication code (CMAC) algorithm. The ECU can create the MAC by inputting the secret key and the data message into the MAC algorithm to create a MAC for the serial bus message to be sent. The ECU can then include the created MAC and the data message with the serial bus message and transmit the serial bus message to its destination.

When the serial bus message is received at another ECU, the MAC can be verified using the data message included in the serial bus message, a copy of the secret key stored at the receiving ECU, and the MAC algorithm. The received data message can be entered along with the copy of the secret key into a MAC algorithm stored at the receiving ECU to create a copy of the MAC that can be used to verify the data message. The data message is authentic when the copy of the MAC created using the copy of the secret key and the received data message matches the MAC included with the serial bus message. If the copy of the MAC does not match the MAC included with the received serial bus message, then the message can be ignored. The use of the MAC can be helpful when communicating serial bus messages that are of high importance or messages that can benefit from a high accuracy rate. Also, including the MAC with the serial bus message permits serial bus messages that omit a checksum or CRC. Nonetheless, the MAC is larger than the CRC when measured as the number of bits they consume.

Figure 1:
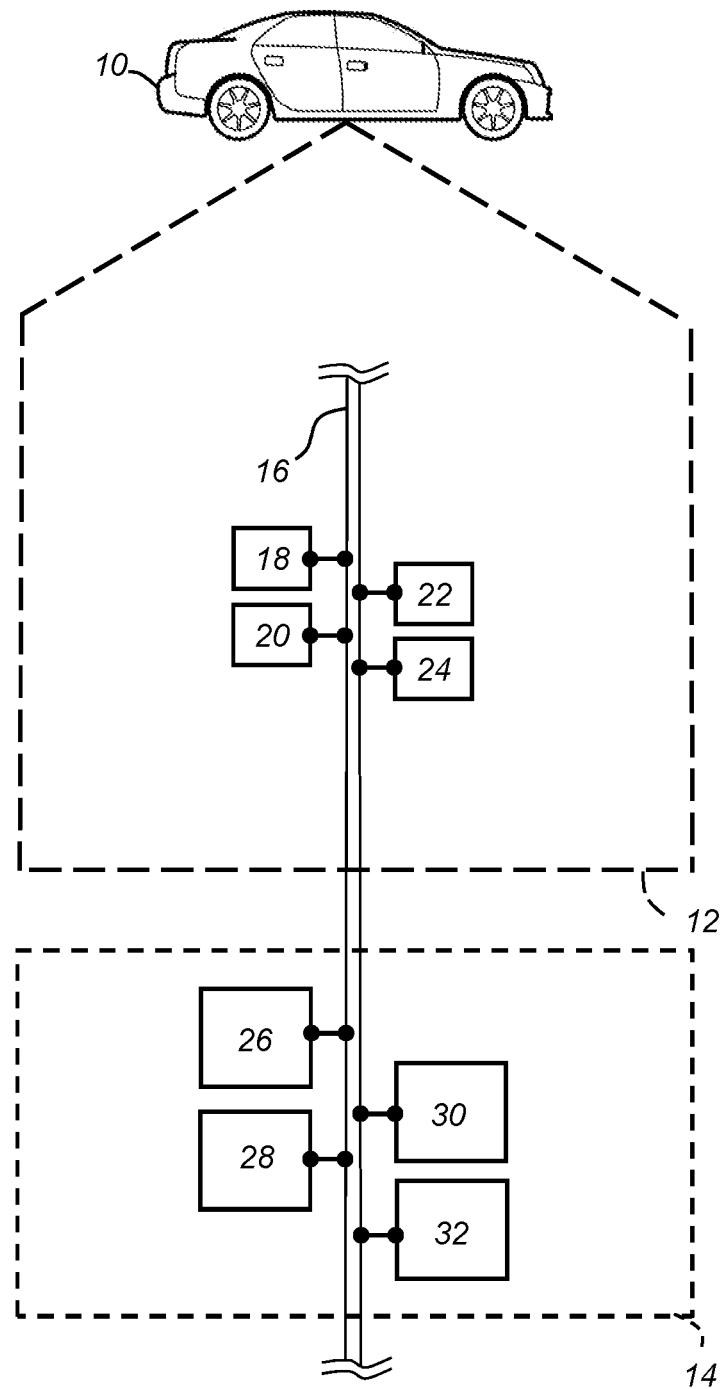
FIG. 1 is a block diagram depicting an embodiment of a vehicle that is capable of utilizing the method disclosed herein.

With reference to FIG. 1, there is shown a vehicle 10 that includes vehicle electronics 12 used to direct vehicle systems 14. The vehicle 10 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. The vehicle electronics 12 and vehicle systems 14 shown in FIG. 1 include an exemplary arrangement of electronic control units (ECUs) that are communicatively connected via a vehicle bus 16.

The vehicle electronics 12 can include electronic control units (ECUs) in the form of electronic hardware components that are located throughout the vehicle 10 and typically receive input from one or more sensors and use the sensed input to perform diagnostic, monitoring, control, reporting and/or other functions. Each of the ECUs is preferably connected by the vehicle bus 16 to the other ECUs and can be programmed to run vehicle systems. The vehicle bus 16 can be implemented using a variety of suitable network connections, such as a controller area network (CAN), a media oriented system transfer (MOST), a local interconnection network (LIN), a local area network (LAN)—both wireless and wired, and other appropriate connections such as Ethernet or others that conform with known ISO, SAE and IEEE standards and specifications, to name but a few. The ECUs using the vehicle bus 16 and shown as part of the vehicle electronics 12 or vehicle systems 14 generally include a microprocessor, a non-volatile memory device that stores computer-readable instructions, and an input/output (I/O) that the ECU uses to communicate over the vehicle bus 16. These components can be varied somewhat based on the particular vehicle systems the ECU may control as well as the type of vehicle bus 16 used. The sophistication and processing power of the microprocessor, the amount of I/O, and complexity of the computer-readable instructions or software can be increased or decreased based on the vehicle function.

The microprocessor can be any type of device capable of processing electronic instructions including microcontrollers, host processors, controllers, vehicle communication processors, and application specific integrated circuits (ASICs). The microprocessor executes various types of digitally-stored instructions, such as software or firmware programs stored in the memory device. For instance, the microprocessor can execute programs or process data to carry out at least a part of the method discussed herein. The memory device can be implemented using known types of random access memory (RAM) or electronically-erasable programmable read-only memory (EEPROMs) while the I/O can be implemented using a controller, such as an Ethernet controller or a CAN controller depending on the type of vehicle bus 16 that is used. In that sense, the ECUs can include hardware that conforms to a particular type of vehicle bus 16 used at the vehicle 12. For example, ECUs communicating using a CAN bus can include a microprocessor, a CAN controller, and an I/O unit in the form of a transceiver that sends and receives serial bus messages in the form of signals over the vehicle bus 16.

The serial bus messages transmitted over the vehicle bus 16 include message authentication codes (MACs) but lack a checksum or CRC. Serial bus messages can include any of several message parts, such as a header, a footer, a rolling count (RC), or a payload while omitting the checksum or CRC. Rather than including the checksum, the message payload of the serial bus message can include the MAC along with a data message. Generally speaking, the data message can comprise a computer-readable instruction that is sent from an ECU and provides direction to another ECU or vehicle function.

The ECUs shown in FIG. 1 include a body control module (BCM) 18, an electronic braking control module (EBCM) 20, a transmission control module (TCM) 22, and an engine control module (ECM) 24. Broadly speaking, the BCM 18 can govern various components located throughout the vehicle 10 that carry out vehicle functions 14, such as a vehicle braking system 26 or the vehicle's power door locks 28, each of which can receive serial bus messages using an ECU. As part of the controlling the braking system 26, the BCM 18 can detect a position of the accelerator/brake pedal of the vehicle 10. The TCM 22 can regulate operation of one or more components of a vehicle transmission 30 while the ECM 24 can control various operational aspects of a vehicle engine 32, such as fuel ignition and ignition timing. The vehicle transmission 30 and the vehicle engine 32 can each include an ECU of their own that receives serial bus messages. As is appreciated by those skilled in the art, the above-mentioned ECUs are only examples of some of the implementations that may be used in vehicle 10, as numerous others are also possible. It should be understood that the disclosed method can be used with any number of ECUs or different vehicle systems and is not specifically limited to the vehicle electronics and systems shown here. Also, the architecture, construction, setup, and operation of the vehicle 10 and its individual components are generally known in the art. Thus, the following paragraphs simply provide a brief overview of one vehicle 10; however, other configurations of vehicles, vehicle systems, or vehicle electronics not shown here could employ the disclosed method as well.

The vehicle electronics 12 may generally support storing multiple copies of a data message sent over the vehicle bus 16. As will be described further below, the storage of multiple copies of data messages and/or information contained in the data messages may allow the vehicle electronics 12 to detect when a serial bus message contains a data message that has been unintentionally manipulated or corrupted. In one example, multiple copies of data messages sent over vehicle bus 16 may be stored in a single ECU, e.g., one of ECUs 18, 20, 22, and 24, from which a message is sent. However, data messages may be duplicated across different devices within vehicle electronics 12, such as in different devices, physical locations, ECUs, etc. In some exemplary approaches, one copy of the data message or information may be stored in a volatile memory, e.g., of the ECUs 18, 20, 22, and 24, or may otherwise be accessible or available during storage of the data message. In this manner, the information or data may be used by the vehicle electronics, e.g., as part of the function of an ECU, during storage of the information. In another example, copies of data messages or information may be created or stored generally at the time a serial bus message is constructed. Accordingly, multiple copies of data messages may be created as information or data is generated, or the multiple copies may be duplicated at the time a serial bus message is constructed for transmission across the vehicle bus 16.

Figure 2:
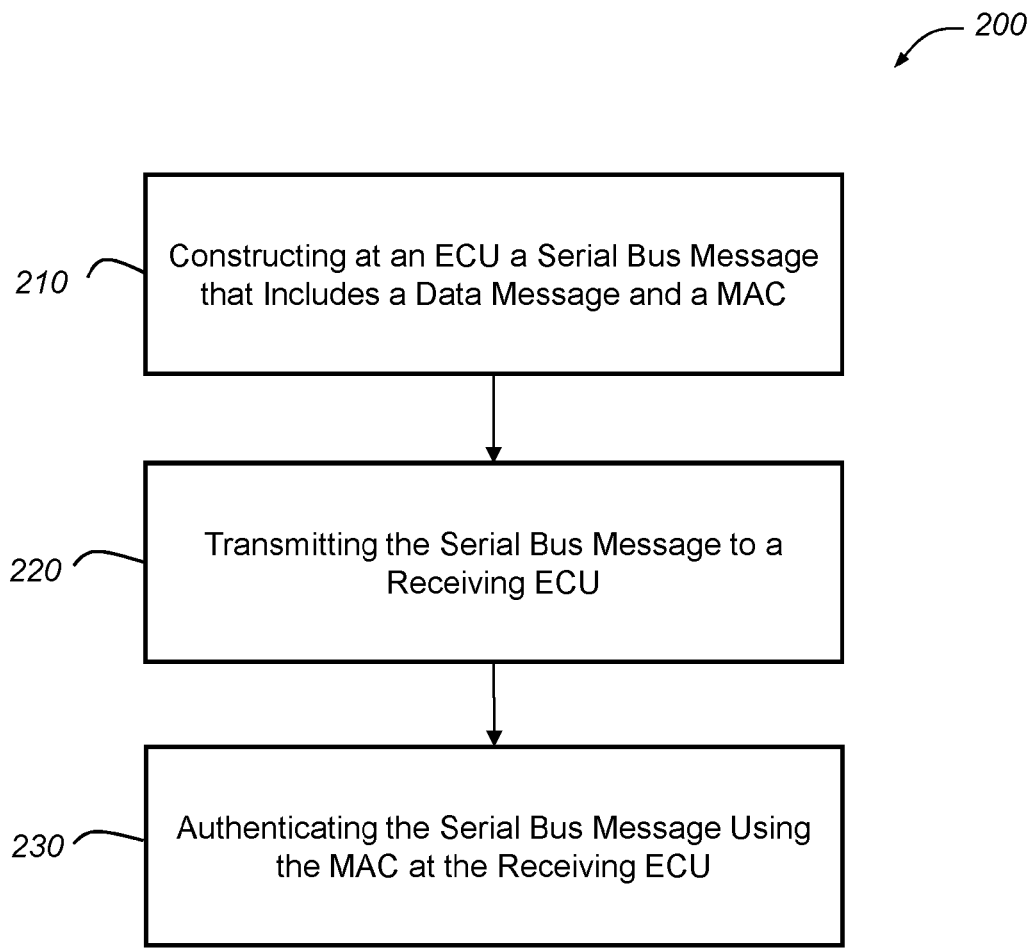
FIG. 2 is a flow chart depicting an embodiment of a method of transmitting data within a vehicle over a vehicle bus.

Turning now to FIG. 2, there is shown an exemplary implementation of a method 200 of transmitting data within the vehicle 10 over the vehicle bus 16 that begins at step 210 by constructing, at an electronic control unit (ECU), a serial bus message that includes a payload comprising a data message and a message authentication code (MAC). Each ECU can create a MAC and include the MAC with a serial bus message the ECU sends over the vehicle bus 16. The MAC can be created by inputting a secret key into a MAC algorithm along with the data message. The resulting MAC can then be included in the payload of the serial bus message. The length of the MAC as measured in bits can be variable but in one embodiment the MAC length can be specified to be greater than 30 bits.

In one example, the BCM 18 can detect the position of a brake pedal and generate a serial bus message including a MAC and a data message that instructs an ECU used by the braking system 26 to alter the braking force used at the vehicle 10. Another example could involve the ECM 24 determining that the vehicle engine has reached an RPM limit and generating a serial bus message directing the vehicle transmission to shift into a higher gear. The serial bus message generated by the ECM 24 can include the instruction to shift gears in the data message and use both the secret key and the data message to create a MAC for inclusion in the payload of the serial bus message. The serial bus message can then be transmitted from the ECM 24 to the TCM 22 or alternatively the vehicle transmission 30 directly. The method 200 proceeds to step 220.

At step 220, the serial bus message is transmitted to a receiving ECU over the vehicle bus 16. After generating the serial bus message that includes the MAC, the ECU can transmit the message over the vehicle bus 16 to another ECU. The ECU receiving the serial bus message can then be authenticated before instructions or information included in the data message of the serial bus message is acted on. Continuing the examples discussed above, the BCM 18 can transmit the serial bus message including the MAC to an ECU at the braking system 26. And the ECM 24 can send the generated serial bus message including the MAC to an ECU at the TCM 22. The method 200 proceeds to step 230.

At step 230, the serial bus message is authenticated at the receiving ECU using a copy of the secret key stored at the receiving ECU. When a serial bus message is received, the MAC included with the message can be verified using the data message of the serial bus message and the copy of the secret key. The receiving ECU can create a copy of the MAC using the data message included in the payload of the serial bus message. The MAC copy can be calculated by entering the data message from the received serial bus message and the copy of the secret key into the MAC algorithm. Both the copy of the secret key and the MAC algorithm can be stored at the receiving ECU. The ECU can then compare the calculated copy of the MAC with the MAC included in the payload of the serial bus message. The receiving ECU can reject or accept the data message included in the received serial bus message based on the comparison. If the calculated copy of the MAC matches the MAC included in the received serial bus message, the receiving ECU can determine that the data message is accurate and has not been either intentionally or unintentionally corrupted or altered. The receiving ECU can then act on the instructions included in the data message. However, if the calculated copy of the MAC does not match the MAC included in the received serial bus message, the receiving ECU can determine that the data message has been corrupted—either intentionally or unintentionally.

Advancing the examples introduced above, the serial bus message including a MAC and a data message that instructs an ECU used by the braking system 26 to alter the braking force used at the vehicle 10 can be verified at an ECU used by the braking system 26. The receiving ECU at the braking system 26 can use a copy of the secret key and MAC algorithm to create a copy of the MAC included with serial bus message. By entering the data message representing the instruction to alter braking force and the secret key into the MAC algorithm, the receiving ECU at the braking system 26 can create the copy MAC to compare with the received MAC. If the MAC copy matches the received MAC, the vehicle braking system 26 can act on the instruction to alter braking force; otherwise, the instruction can be ignored. With respect to the other example, the TCM 22 can receive the serial bus message directing the vehicle transmission to shift into a higher gear and verify the message using the included MAC and data message. An ECU at the TCM 22 can create a MAC copy by entering the data message portion of the received serial bus message that directs the transmission to shift along with a copy of the secret key into the MAC algorithm. If the MAC copy matches the received MAC, the TCM 22 can determine that the instruction to shift gears is correct and not corrupted either intentionally or unintentionally. However, if the MAC copy does not match the received MAC, the TCM 22 can ignore the message to shift. The TCM 22 can then create a serial bus message instructing the transmission to change gears and include with the message a MAC. The serial bus message can then be sent to an ECU at the vehicle transmission 30 and authenticated as discussed above.

Figure 3:
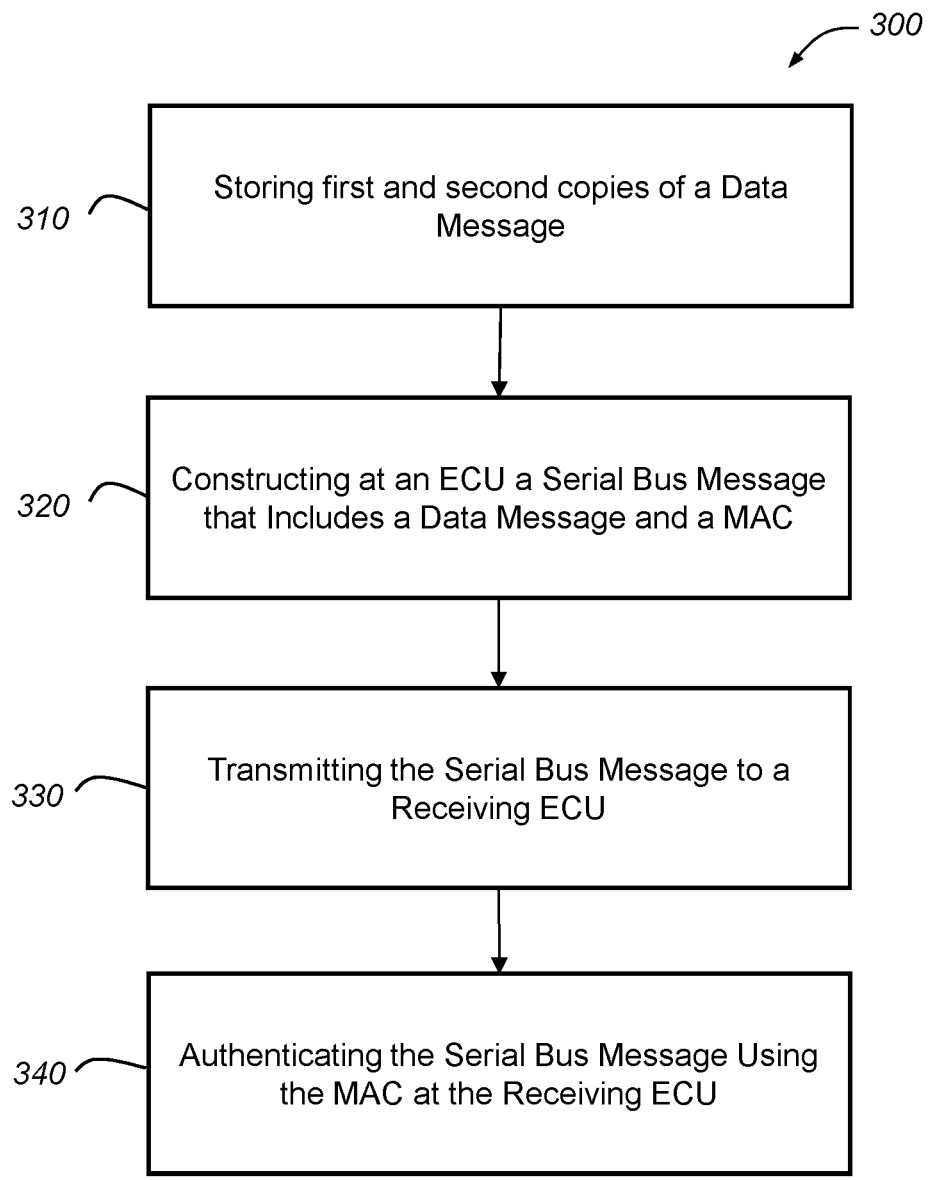
FIG. 3 is a flow chart depicting another embodiment of a method of transmitting data within a vehicle over a vehicle bus.

Turning now to FIG. 3, another example process 300 of transmitting data over a vehicle bus is illustrated. Generally, process 300 may provide additional protection against unintentional manipulation or corruption of messages sent over the vehicle bus 16 by duplicating sent data. More specifically, data to be transferred from one ECU to another may be written in two memory locations, e.g., within the transmitting ECU. A first copy of the data may be placed into the message sent from the transmitting ECU to the receiving ECU, while a second copy is used to create the MAC placed into the message. Accordingly, as will be described further below, any difference between the copies, e.g., resulting from unintentional manipulation or corruption, will result in a mismatch of the copy of the MAC created from the data at the receiving ECU and the MAC placed into the message, thereby causing the vehicle electronics 12 to reject the message upon receipt.

Process 300 may generally begin at block 310, where first and second copies of a data message are stored in at least one memory installed to the vehicle 10. In some examples, multiple copies of a data message may be stored within a sending ECU. In other examples, multiple memory devices may be used such that the copies of the data message are distributed across different physical locations in vehicle 10, different ECUs, etc. An ECU may duplicate information on an ongoing basis, essentially maintaining two separate memory locations containing information that is identical. Alternatively, an ECU may duplicate information when a serial bus message is constructed. Regardless of which approach is used, the first copy of the data message, e.g., stored in memory A, is expected to match that in a second memory location B so long as each memory location is not corrupted, manipulated, or otherwise faulty. Process 300 may then proceed to block 320.

At block 320, a serial bus message may be constructed, e.g., at an electronic control unit (ECU). The serial bus message may include a payload comprising a data message and a message authentication code (MAC). In this example, the message contains a data message from the first memory location, and a MAC which is computed using the data from the second memory location.

As noted above, each ECU can create a MAC and include the MAC with a serial bus message the ECU sends over the vehicle bus 16. The MAC can be created by inputting a secret key into a MAC algorithm along with the data message. The resulting MAC can then be included in the payload of the serial bus message. The length of the MAC as measured in bits can be variable but in one embodiment the MAC length can be specified to be greater than 30 bits.

In an example, the BCM 18 can detect the position of a brake pedal, information for which is duplicated in the two memories. For example, BCM 18 may generally duplicate information generated by the BCM 18 such that two copies of the information used to generate a serial bus message are available on an ongoing basis. The BCM 18 may then generate a serial bus message including a data message, which is created from a first one of the data message copies, that instructs an ECU used by the braking system 26 to alter the braking force used at the vehicle 10. The serial bus message constructed by the BCM 18 also includes a MAC, which is generated from a second copy of the data message. The two separate copies may, but are not required, to correspond to physically separate memory locations in the vehicle 10 or vehicle electronics 12.

In another example, the ECM 24 may also be configured to duplicate information sent across the vehicle bus 16. The ECM 24 may determine that the vehicle engine has reached an RPM limit and may generate a serial bus message directing the vehicle transmission to shift into a higher gear. The serial bus message generated by the ECM 24 can include the instruction to shift gears in the data message, which is created from a first copy of the information. The serial bus message constructed by the ECM 24 may also include a MAC in the payload of the serial bus message. The MAC may be generated using the secret key and the duplicate copy of the data message. The serial bus message can then be transmitted from the ECM 24 to the TCM 22, or alternatively to the vehicle transmission 30 directly. The method 300 may then proceed to step 330.

At step 330, the serial bus message is transmitted to a receiving ECU over the vehicle bus 16. After generating the serial bus message that includes the MAC, the ECU can transmit the message over the vehicle bus 16 to another ECU. The ECU receiving the serial bus message can then be authenticated before instructions or information included in the data message of the serial bus message is acted on. Continuing the examples discussed above, the BCM 18 can transmit the serial bus message including the MAC to an ECU at the braking system 26. The ECM 24 can send the generated serial bus message including the MAC to an ECU at the TCM 22. The method 300 may then proceed to step 340.

At step 340, the serial bus message is authenticated at the receiving ECU using a copy of the secret key stored at the receiving ECU. When a serial bus message is received, the MAC included with the message can be verified using the data message of the serial bus message and the copy of the secret key (stored at the receiving ECU). The receiving ECU can create a copy of the MAC using the data message included in the payload of the serial bus message, which was generated using one copy of the data message at the sending ECU. The MAC copy can be generated, at the receiving ECU, by entering the data message from the received serial bus message and the copy of the secret key into the MAC algorithm. Both the copy of the secret key and the MAC algorithm can be stored at the receiving ECU. The ECU can then compare the calculated copy of the MAC with the MAC included in the payload of the serial bus message. The receiving ECU can reject or accept the data message included in the received serial bus message based on the comparison. If the calculated copy of the MAC matches the MAC included in the received serial bus message, the receiving ECU can determine that the data message is accurate and has not been either intentionally or unintentionally corrupted or altered. The receiving ECU can then act on the instructions included in the data message. However, if the calculated copy of the MAC does not match the MAC included in the received serial bus message, the receiving ECU can determine that the data message has been corrupted. The receiving ECU may then discard the message, set a flag indicating data corruption, or otherwise generate an error report to indicate the manipulated/corrupted data. While the use of a MAC and secret key may help identify any data corruption occurring intentionally or unintentionally, the duplication of data to create two copies may particularly limit problems due to unintentional manipulation of data.

Advancing the examples introduced above, the serial bus message including a MAC and a data message that instructs an ECU used by the braking system 26 to alter the braking force used at the vehicle 10 can be verified at an ECU used by the braking system 26. The receiving ECU at the braking system 26 can use a copy of the secret key and MAC algorithm to create a copy of the MAC included with serial bus message. By entering the data message representing the instruction to alter braking force and the secret key into the MAC algorithm, the receiving ECU at the braking system 26 can create the copy MAC to compare with the received MAC. If the MAC copy matches the received MAC, the vehicle braking system 26 can act on the instruction to alter braking force; otherwise, the instruction can be ignored. With respect to the other example, the TCM 22 can receive the serial bus message directing the vehicle transmission to shift into a higher gear and verify the message using the included MAC and data message. An ECU at the TCM 22 can create a MAC copy by entering the data message portion of the received serial bus message that directs the transmission to shift along with a copy of the secret key into the MAC algorithm. If the MAC copy matches the received MAC, the TCM 22 can determine that the instruction to shift gears is correct and not corrupted either intentionally or unintentionally. However, if the MAC copy does not match the received MAC, the TCM 22 can ignore the message to shift. The TCM 22 can then create a serial bus message instructing the transmission to change gears and include with the message a MAC. The serial bus message can then be sent to an ECU at the vehicle transmission 30 and authenticated as discussed above. In each of the illustrated examples, the use of separate/duplicate copies of data by the sending ECU to create the data message and MAC may help prevent the use of unintentionally corrupted data, e.g., when an error, damage, or other condition occurs causing manipulation of one copy of the data message.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of transmitting data within a vehicle over a vehicle bus, comprising the steps of:
    (a) storing a first copy of a data message in a first memory installed to the vehicle, and a second copy of the data message in a second memory installed to the vehicle, the second memory physically separated from the first memory;
    (b) constructing at an electronic control unit (ECU) a serial bus message that includes:
        (1) the first copy of the data message as retrieved from the first memory; and
        (2) a message authentication code (MAC), wherein the MAC is created using a secret key stored at the ECU, a MAC algorithm, and the second copy of the data message as retrieved from the second memory;
    (c) transmitting the serial bus message to a receiving ECU over the vehicle bus; and
    (d) authenticating the serial bus message at the receiving ECU using a copy of the secret key stored at the receiving ECU by:
        (d1) creating a copy of the MAC from the first copy of the data message included in the serial bus message, the copy of the secret key, and the MAC algorithm;
        (d2) comparing the MAC included in the serial bus message with the copy of the MAC created at the receiving ECU; and
        (d3) rejecting or accepting the data message based on the comparison in step (d2).

2. The method of claim 1, wherein a length of the MAC is greater than 30 bits.

3. The method of claim 1, wherein the vehicle bus is a controller area network (CAN) bus, a media oriented system transfer (MOST) bus, or a local area network (LAN).

4. The method of claim 1, further comprising the step of including the MAC in a payload of the serial bus message.

5. The method of claim 1, wherein the ECU controls one or more vehicle systems.

6. The method of claim 1, wherein storing the first and second copies of the data message includes storing the first and second copies in physically separate locations.

7. The method of claim 1, wherein storing the first and second copies of the data message includes storing the first and second copies in a same physical location.

8. The method of claim 1, further comprising storing at least one of the first and second copies of the data message in a volatile memory of the sending ECU prior to constructing the serial bus message.

9. The method of claim 1, further comprising creating the first and second copies of the data message at the time the serial bus message is constructed.

10. A method of transmitting data within a vehicle over a vehicle bus, comprising the steps of:
    (a) storing a first copy of a data message in a first memory installed to the vehicle, and a second copy of the data message in a second memory installed to the vehicle, the second memory physically separated from the first memory, wherein at least one of the first and second copies of the data message is stored in a volatile memory of the sending ECU;
    (b) after step (a), constructing at an electronic control unit (ECU) a serial bus message that includes:
        (1) the first copy of the data message as retrieved from the first memory; and
        (2) a message authentication code (MAC), wherein the MAC is created using a secret key stored at the ECU, a MAC algorithm, and the second copy of the data message as retrieved from the second memory;
    (c) transmitting the serial bus message to a receiving ECU over the vehicle bus;
    (d) authenticating the serial bus message at the receiving ECU using a copy of the secret key stored at the receiving ECU by:
        (d1) creating a copy of the MAC from the first copy of the data message included in the serial bus message, the copy of the secret key, and the MAC algorithm;
        (d2) comparing the MAC included in the serial bus message with the copy of the MAC created at the receiving ECU; and
        (d3) rejecting or accepting the data message based on the comparison in step (d2).

11. A electronic control unit (ECU) for transmitting data within a vehicle over a vehicle bus, comprising:
    a microprocessor that executes one or more computer-readable instructions;

first and second memory devices communicatively coupled with the microprocessor such that the memory devices can receive requests from the microprocessor for data stored at the memory devices, the first and second memory devices configured to store first and second copies of a data message, respectively, the second memory device physically separated from the first memory device;

an input/output port for sending and receiving data over a vehicle bus;

a secret key stored in the memory device; and a message authentication code (MAC) algorithm stored at the memory device, wherein the microprocessor creates a serial bus message, the serial bus message including a data message comprising the first copy of the data message as retrieved from the first memory, the serial bus message including a message authentication code (MAC) that is created using the second copy of the data message as retrieved from the second memory, the secret key, and the MAC algorithm.

12. The ECU of claim 11, wherein a length of the MAC is greater than 30 bits.

13. The ECU of claim 12, wherein the vehicle bus is a controller area network (CAN) bus, a media oriented system transfer (MOST) bus, or a local area network (LAN).

14. The ECU of claim 13, wherein the MAC is located in a payload of the serial bus message.

15. The ECU of claim 14, wherein the ECU controls one or more vehicle systems.

16. The ECU of claim 11, wherein the memory devices comprise physically separate locations for storing the first and second copies of the data message, respectively.

17. The ECU of claim 11, wherein the at least one memory device is configured to store at least one of the first and second copies of the data message in a volatile memory of the sending ECU prior to constructing the serial bus message.

* * * * *